June 11, 1963     H. G. GENTRY ET AL     3,093,035
APPARATUS AND METHOD FOR PRODUCING A REINFORCED CONTAINER
Filed Aug. 14, 1961     15 Sheets-Sheet 1

INVENTORS
Hermond G. Gentry,
Edmund Radzins,
Charles J. Fortriede
BY
ATTORNEY.

INVENTORS
Hermond G. Gentry,
Edmund Radzins,
Charles J. Fortriede
BY
ATTORNEY

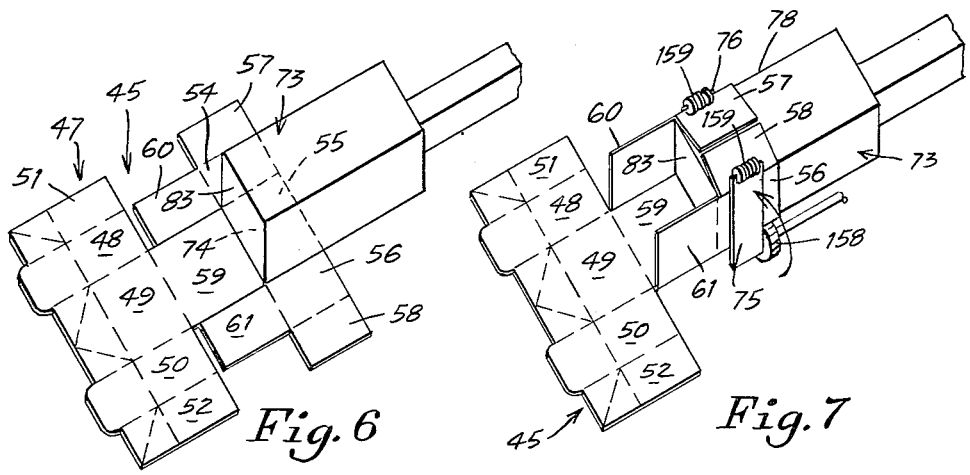
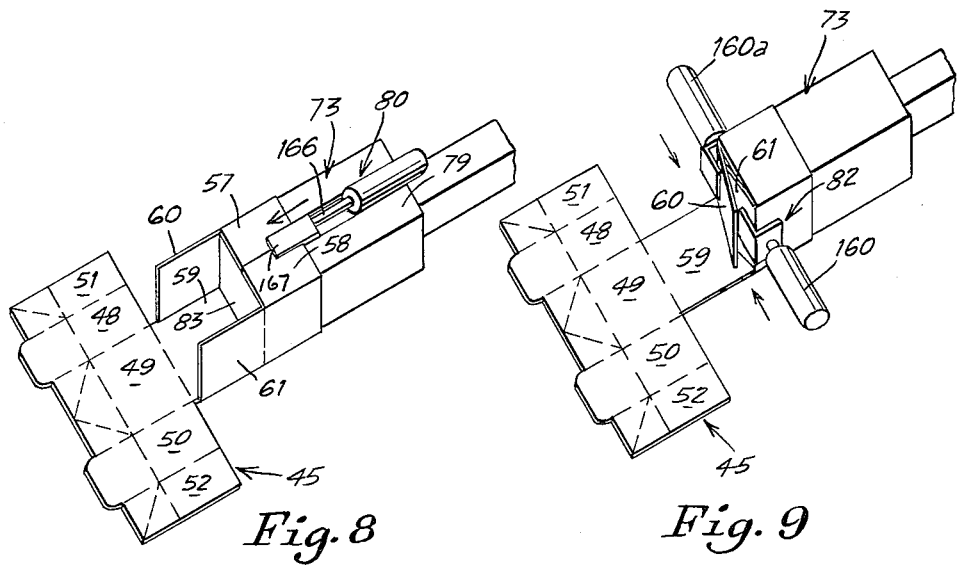

INVENTORS
Hermond G Gentry,
Edmund Radzins,
Charles J. Fortriede
BY
ATTORNEY.

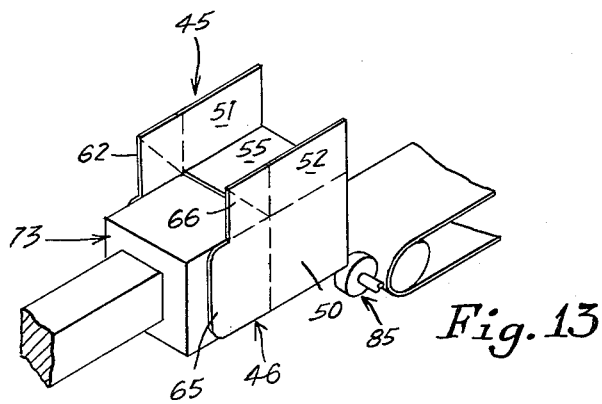
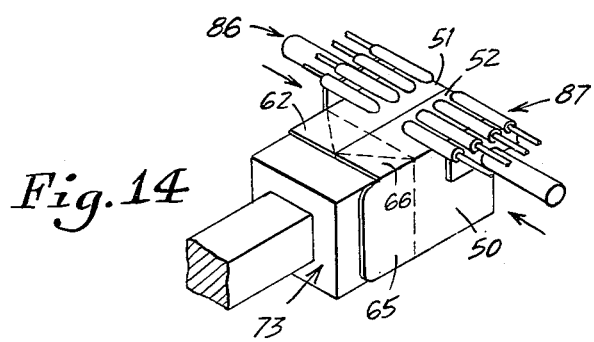
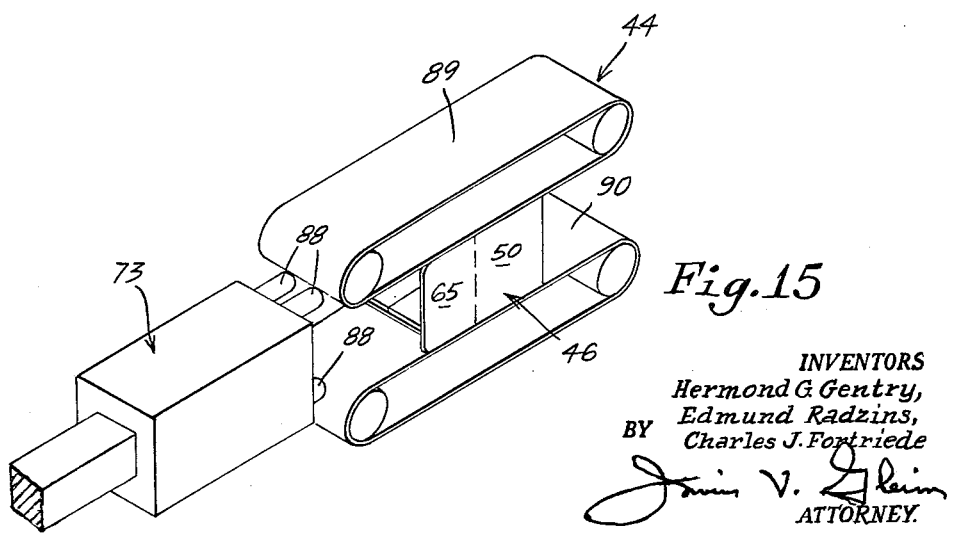

INVENTORS
Hermond G. Gentry,
Edmund Radzins,
Charles J. Fortriede
BY
ATTORNEY.

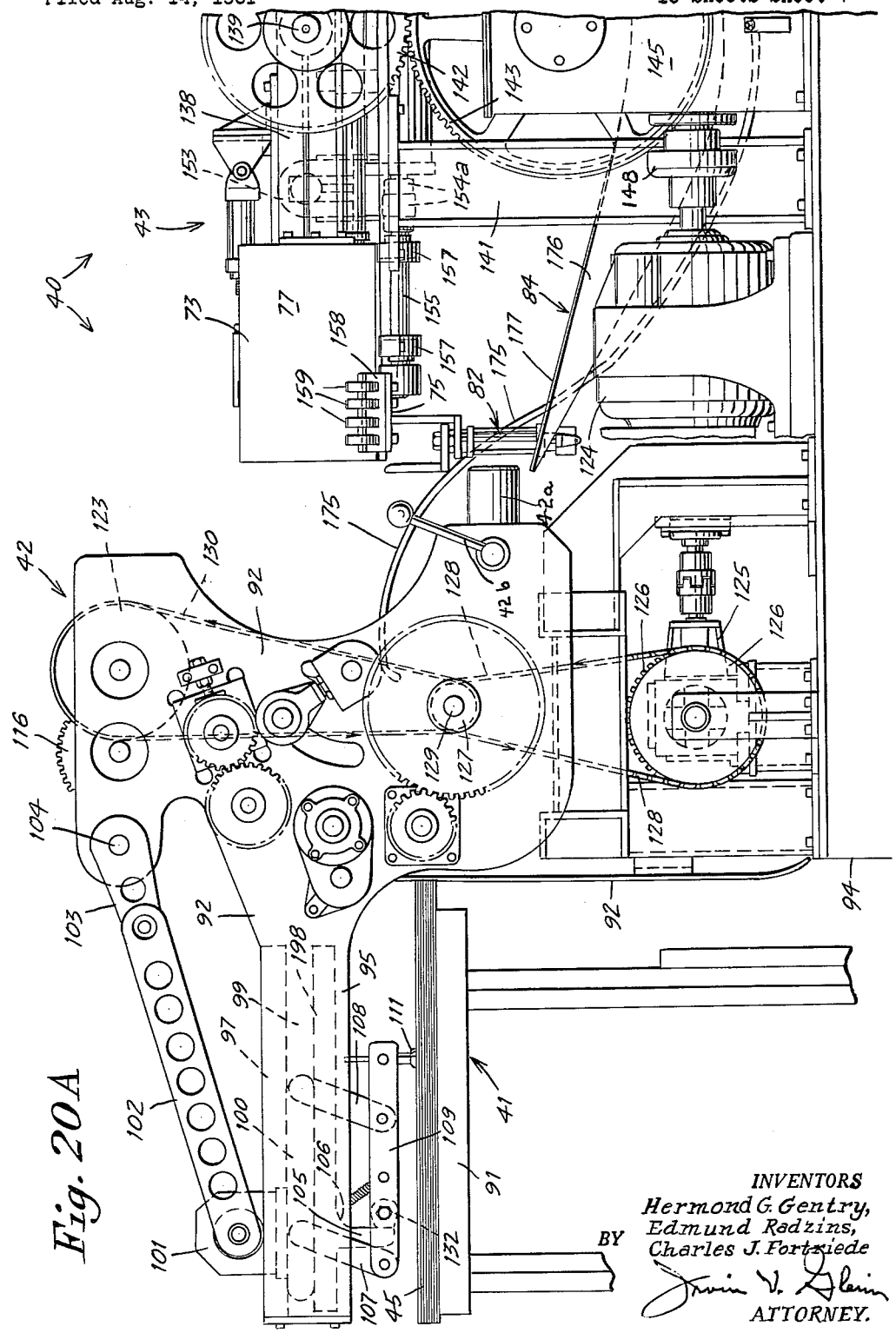

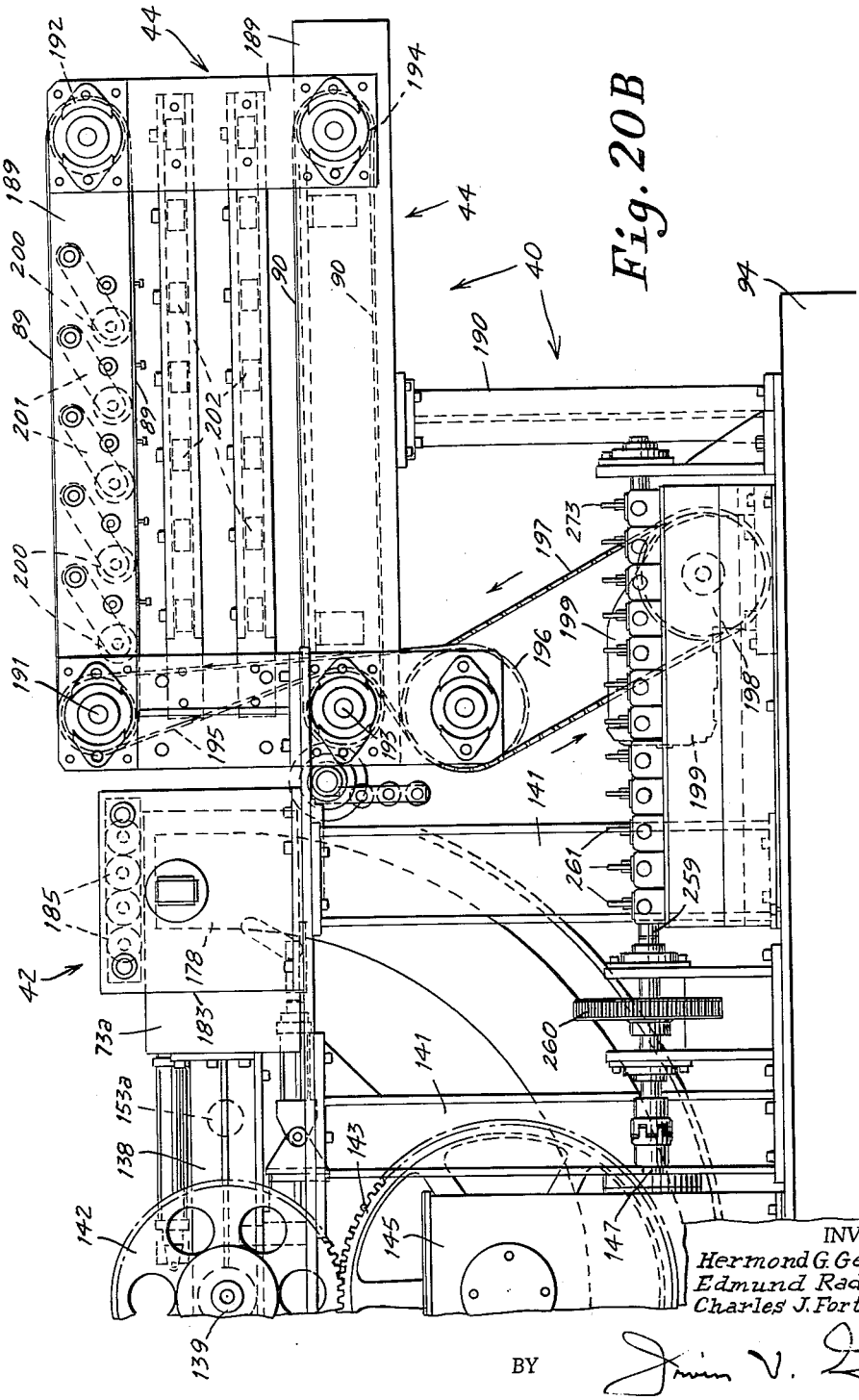

INVENTORS
Hermond G. Gentry,
Edmund Radzins,
BY Charles J. Fortriede

ATTORNEY.

June 11, 1963  H. G. GENTRY ET AL  3,093,035
APPARATUS AND METHOD FOR PRODUCING A REINFORCED CONTAINER
Filed Aug. 14, 1961  15 Sheets-Sheet 12

INVENTORS
Hermond G. Gentry,
Edmund Radzins,
Charles J. Fortriede
BY
ATTORNEY.

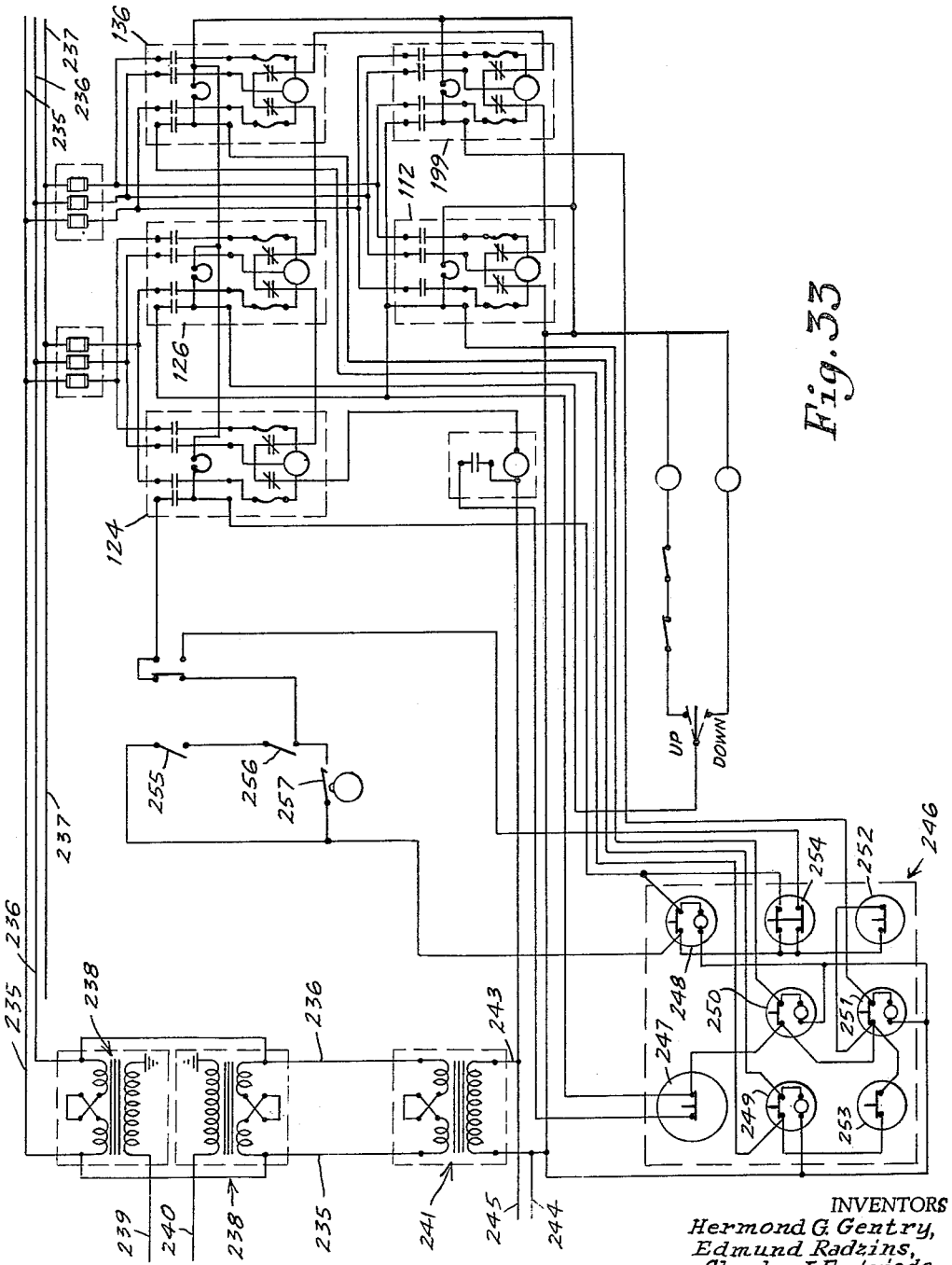

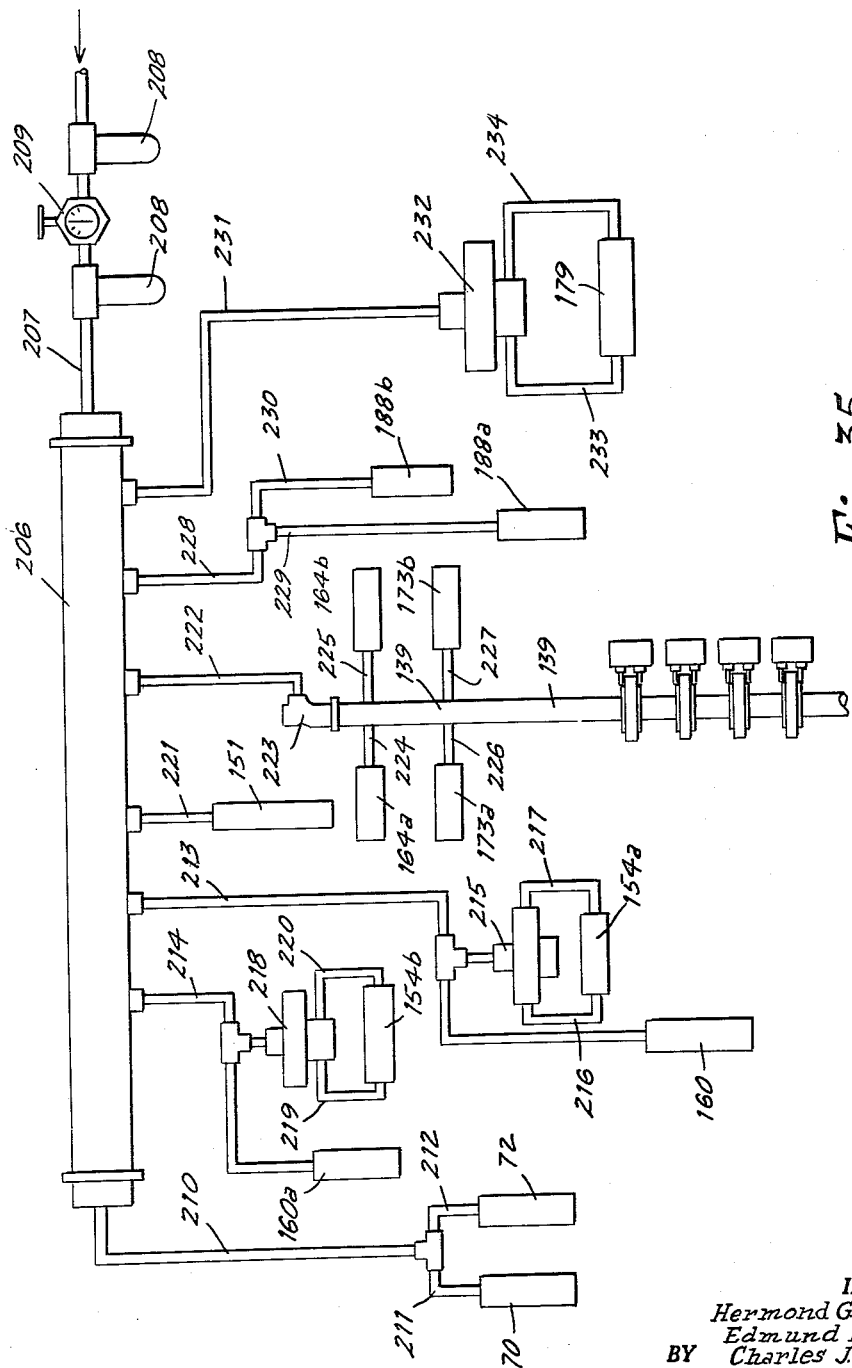

UnitedStatesPatentOffice 3,093,035
Patented June 11, 1963

3,093,035
APPARATUS AND METHOD FOR PRODUCING A REINFORCED CONTAINER
Hermond G. Gentry, Atlanta, Ga., Edmund Radzins, Sheboygan Falls, Wis., and Charles J. Fortriede, Cold Springs, Ky., assignors to The Mead Corporation, Dayton, Ohio, a corporation of Ohio
Filed Aug. 14, 1961, Ser. No. 131,238
14 Claims. (Cl. 93—44.1)

This invention relates to an improved method and apparatus for forming an erected carton from a flat blank. More particularly, this invention relates to an improved method and apparatus for mechanically and continuously forming erected cartons from a supply of flat carton blanks.

Generally, this invention provides an improved method and apparatus for forming an erected carton from a suitably cut and scored carton blank comprising a series of connected side wall means which includes side panels and terminal panels. The innermost full panel of the side wall means is foldably connected to a series of inner side wall means by a bottom panel, inner side wall means including a suitable number of full panels which may, if desired, include opposed terminal panels. Moreover, the bottom panels may be connected to the side wall means. And, if desired, suitable closure flaps may be connected to the side wall means for selectively closing the carton.

The method and apparatus of a preferred embodiment of this invention erects the carton from the above described blank in such a way that the inner side wall means is folded to form four inner side walls with the outer side wall means disposed thereabout to provide a double walled container, the bottom panels being disposed in stacked relation to provide a triple bottom thereof.

Accordingly, it is an object of this invention to provide an improved apparatus for automatically forming an erected carton from a flat blank which has been scored, slitted, slotted and/or perforated to a suitably designed pattern.

It is another object to provide an improved method for forming such an erected carton.

Other objects, uses and advantages will become apparent from a reading of the following specification, taken in conjunction with the accompanying drawings forming a part thereof and wherein:

FIGURES 4–15 are respectively, fragmentary perspective views schematically illustrating the various steps in the sequence of operation of the apparatus of FIGURE 1 in forming an erected carton from a carton blank;

Figure 1:
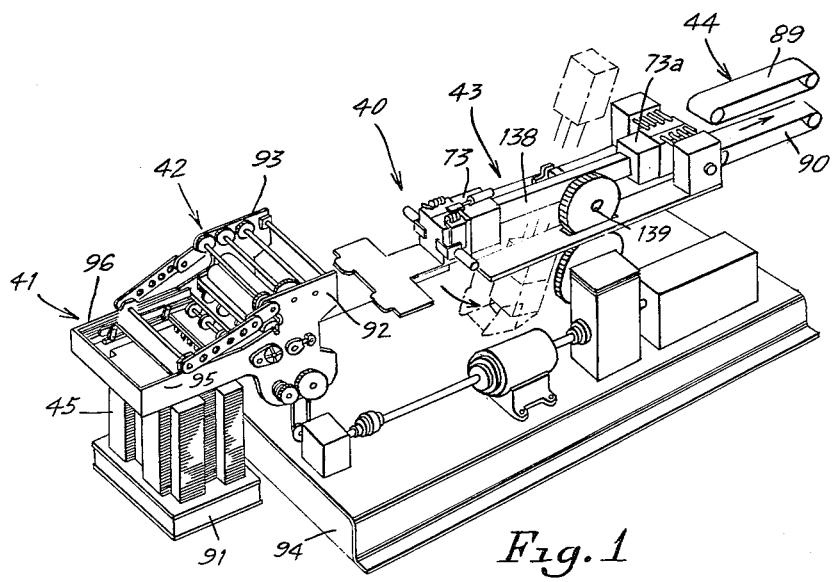
FIGURE 1 is a schematic, perspective view illustrating the apparatus of this invention.
Figure 2:
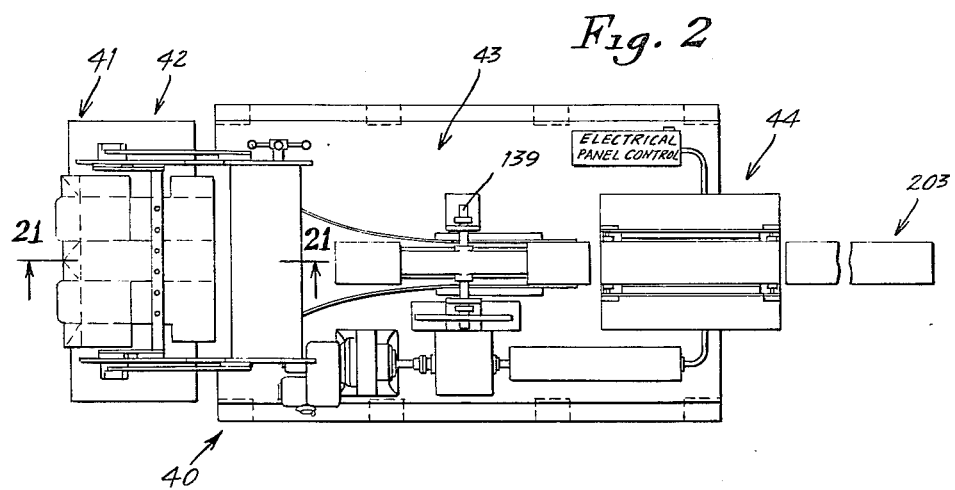
FIGURE 2 is a top view of the apparatus illustrated in FIGURE 1.
Figure 21:
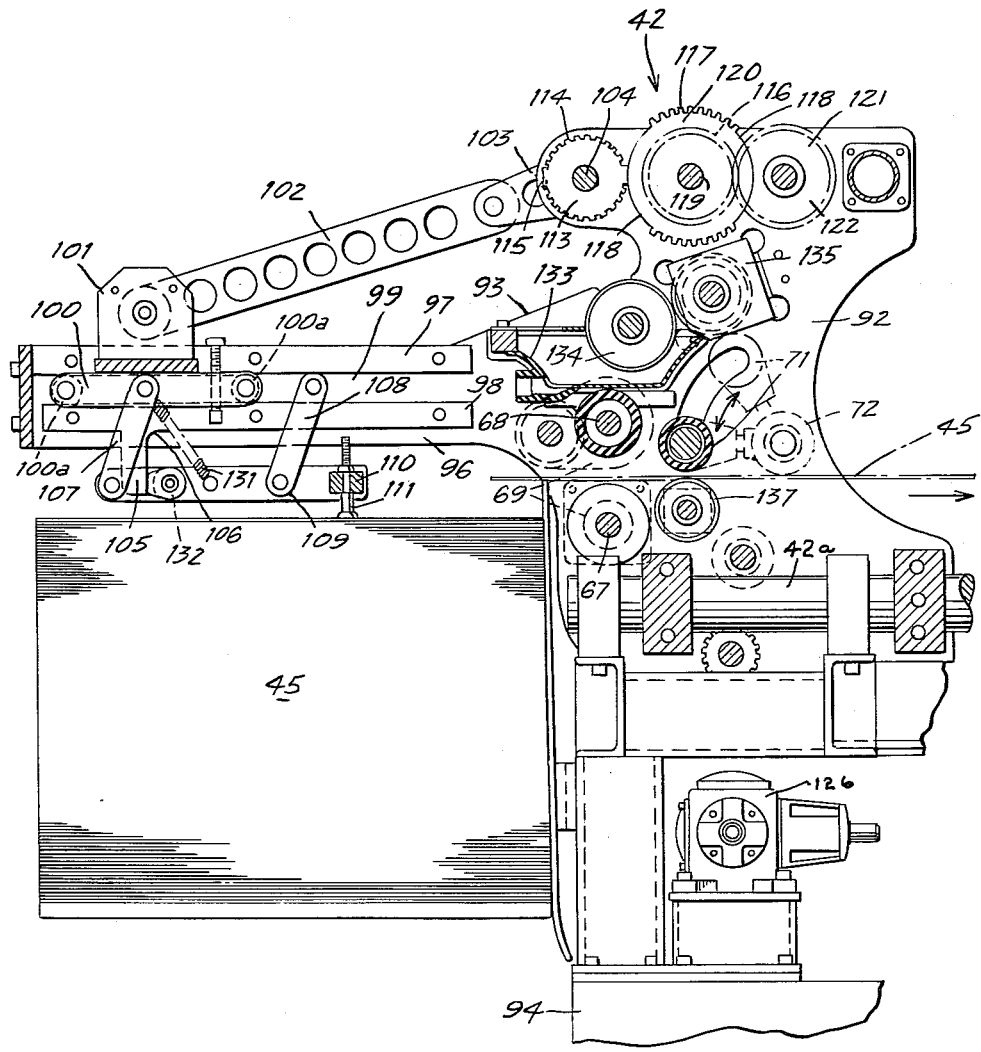
Figure 22:
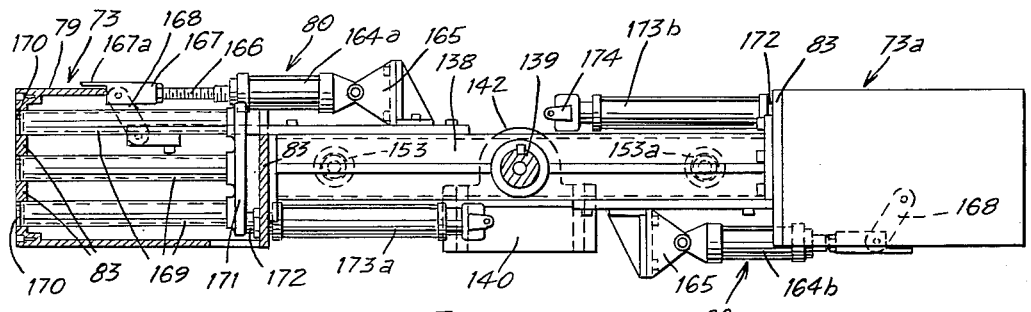
Figure 24:
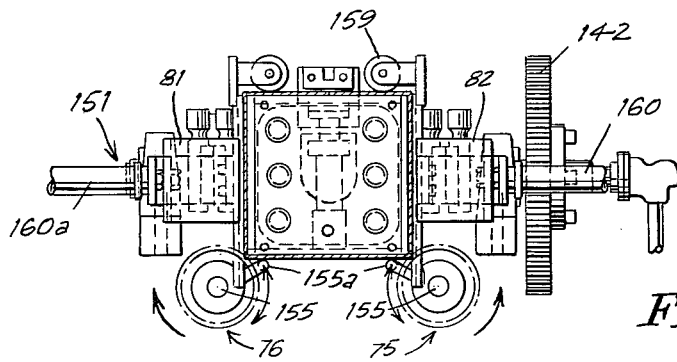
Figure 23:
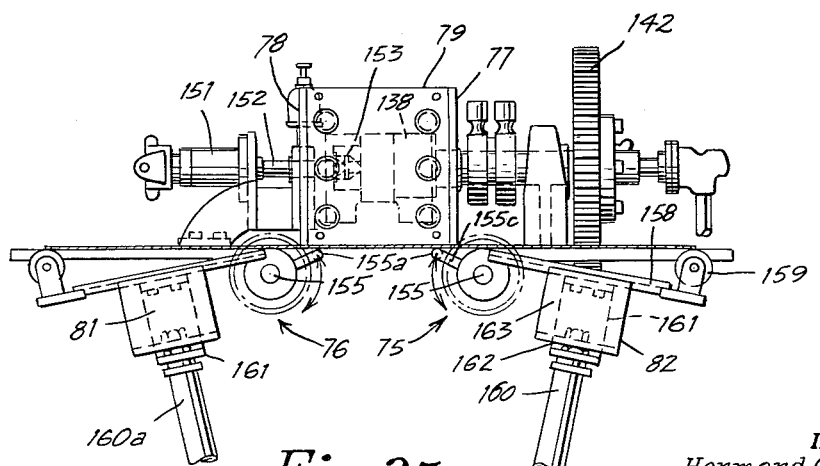
Figure 25:
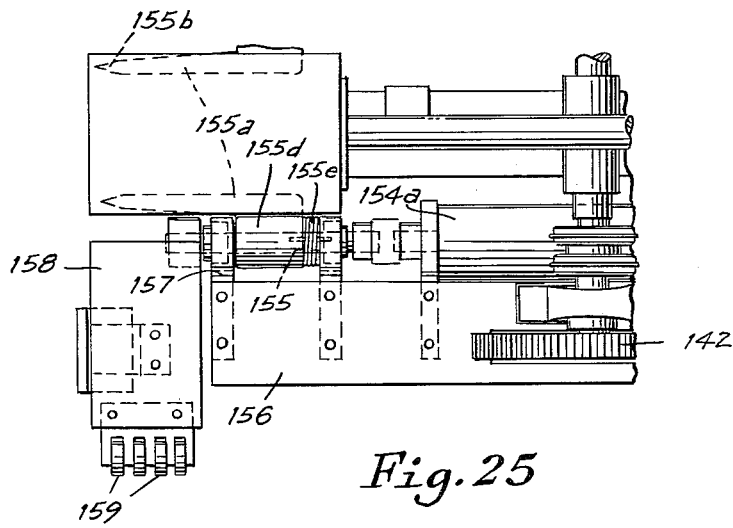
Figure 26:
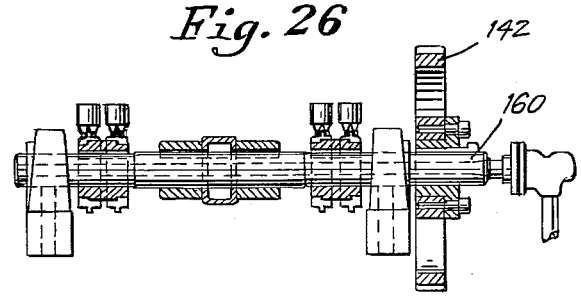
Figure 27:
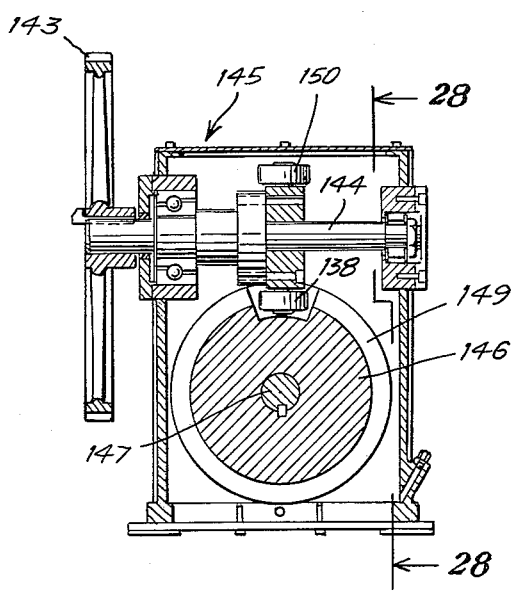
Figure 28:
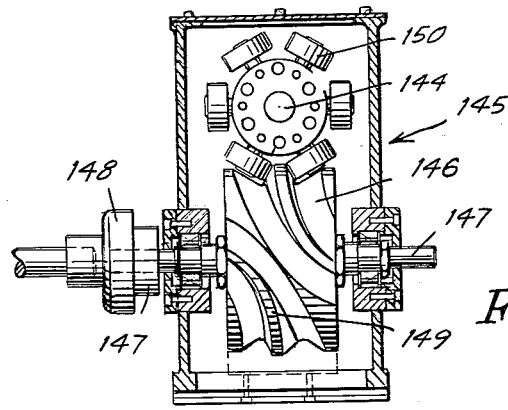
Figure 29:
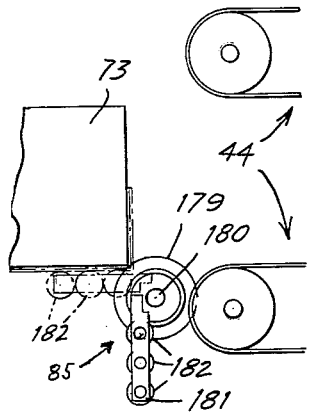
Figure 30:
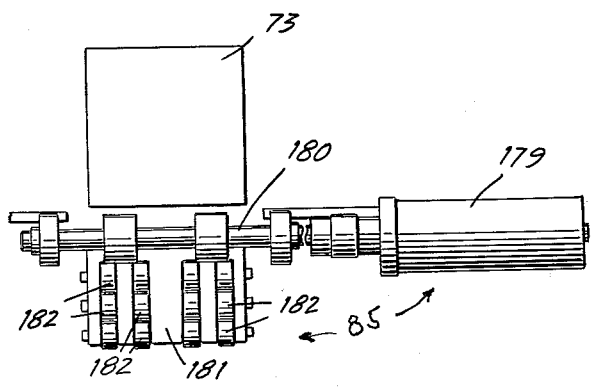
Figure 32:
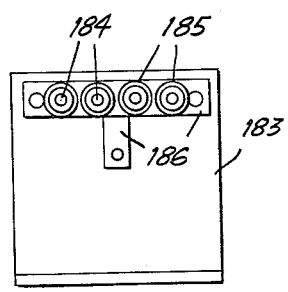
Figure 31:
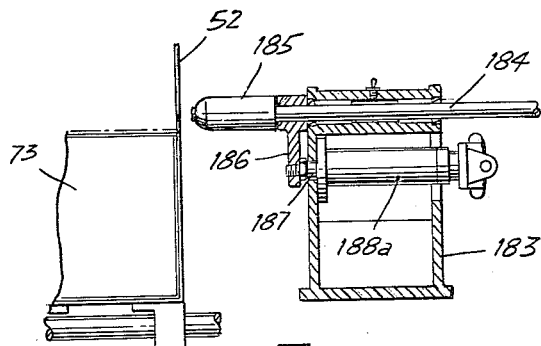
Figure 34:
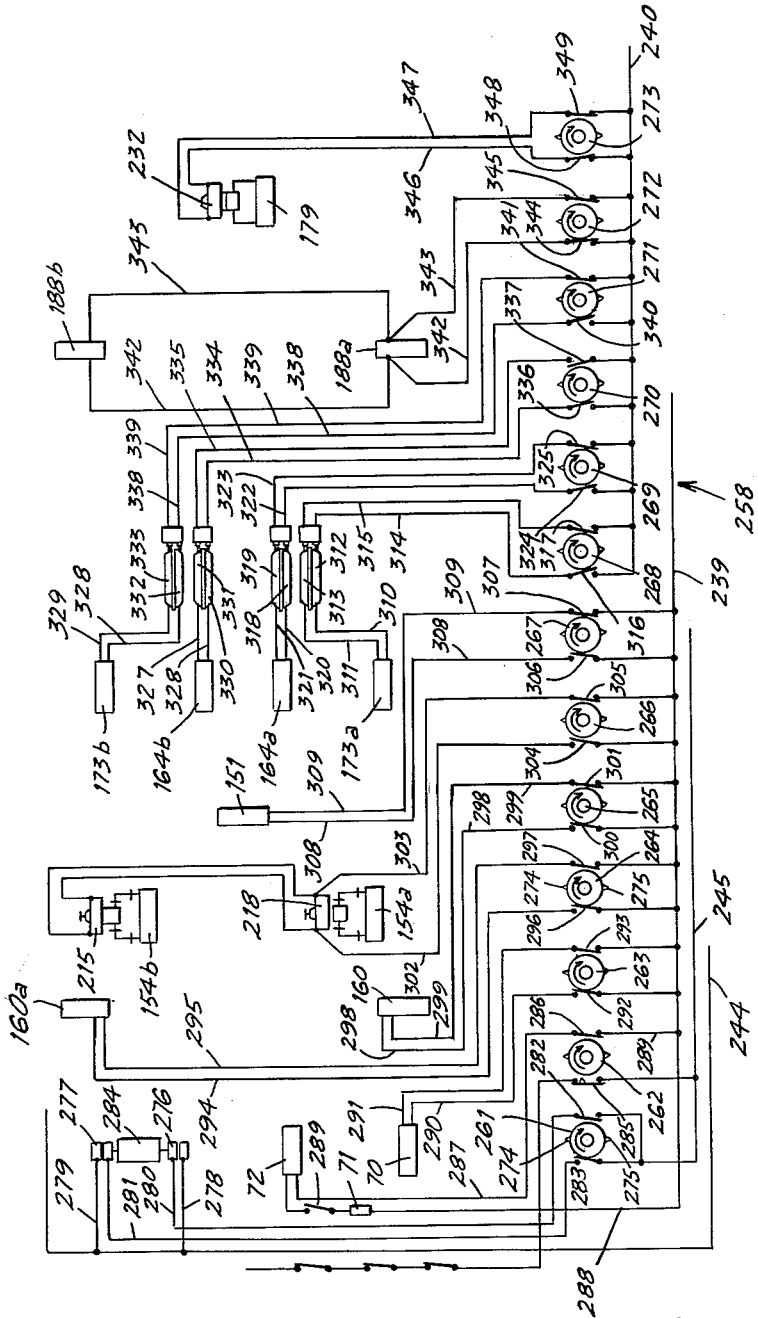

FIGURES 20A and 20B respectively illustrate the two halves of the apparatus of FIGURE 1, and when assembled together, depict the apparatus of FIGURE 1 in an enlarged side elevational view thereof;

FIGURE 21 is an axial cross-sectional view of a portion of the apparatus of FIGURE 2 and is taken on line 21—21 thereof;

FIGURE 22 is a fragmentary view, partially broken away, illustrating a mandrel and a clamping device of the apparatus illustrated in FIGURE 1;

FIGURE 23 is an end view of the mandrel illustrated in FIGURE 22;

FIGURE 24 is a view similar to FIGURE 23 and illustrates certain of the folding apparatus of this invention;

FIGURE 25 is a fragmentary, side view of the mandrel and illustrates the folding apparatus illustrated in FIGURE 24;

FIGURE 26 is a fragmentary view illustrating the pneumatic and electrical connections to the mandrel;

FIGURE 27 is an axial, fragmentary, cross-sectional view illustrating the power means for rotating the mandrel;

FIGURE 28 is a view taken on line 28—28 of FIGURE 27;

FIGURE 29 is a partial view illustrating a folding and clamping device of the apparatus illustrated in FIGURE 1;

FIGURE 30 is an end view of the folding and clamping device illustrated in FIGURE 29;

FIGURE 31 is a fragmentary, cross-sectional view illustrting still another of the folding and clamping devices illustrated in FIGURE 1;

FIGURE 32 is an end view of the folding and clamping device illustrated in FIGURE 31;

FIGURE 33 is a schematic diagram, illustrating the electrical circuit for controlling certain of the operating parts of the apparatus of FIGURE 1;

FIGURE 34 is another schematic wiring diagram, illustrating the electrical circuit for operating still other of the operating parts of the apparatus of FIGURE 1; and, FIGURE 35 is a schematic diagram illustrating the pneumatic system of the apparatus of FIGURE 1.

Figure 16:
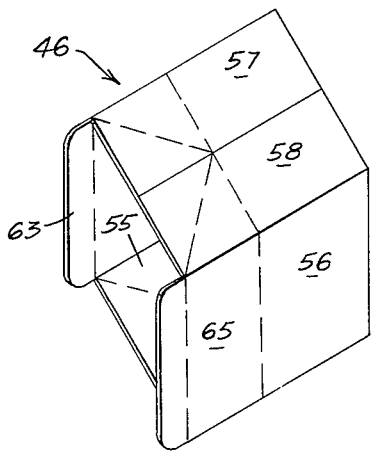
FIGURE 16 is a perspective view illustrating the erected carton formed by this apparatus and invention.

The apparatus of this invention is generally indicated in FIGURES 1, 2, 3, 20A and 20B by reference numeral 40 and comprises a feeding unit 41, a gluing unit 42, a folding unit 43 and a glue setting unit 44. Carton blanks 45 are fed by feeding unit 41 to gluing unit 42 wherein adhesive is applied to selected areas of blank 45 and then blank 45 is fed to folding unit 43 wherein blank 45 is folded to form an erected carton as indicated by reference numeral 46, FIGURE 16. Thereafter, erected carton 46 is clamped and discharged to pass through glue or adhesive setting unit 44 to permit a continuation of the setting of the adhesive and maintain carton 46 in its erected form as illustrated in FIGURE 16.

While the particular carton blank 45 and carton 46 do not form part of the subject matter of this invention, the same do form the subject matter of a co-pending patent application, Serial No. 843,498, filed September 30, 1959. However, sufficient details of carton blank 45 and carton 46 will be hereinafter described in order to adequately describe the method and apparatus of this invention.

Figure 4:
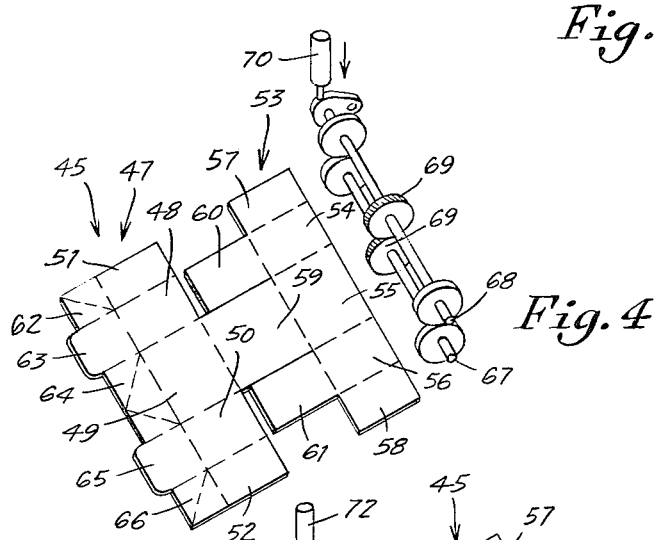

In particular, carton blank 45, FIGURE 4, may be formed of any suitable paper board product and is suitably cut and scored to define a series 47 of foldably connected outer side wall means which include three inner full panels 48, 49 and 50 and two terminal part panels 51 and 52. A second series 53 of foldably connected inner side wall means, which includes three inner full panels 54, 55 and 56 and two terminal part panels 57 and 58 is foldably connected to series 47 by an outside bottom panel 59 respectively foldably connected to full panels 49 and 55. A pair of inner bottom panels 60 and 61 are respectively foldably connected to panels 54 and 56. If desired, suitable closure flaps 62, 63, 64, 65 and 66 are respectively foldably connected to series 47 of panels 51, 48, 49, 50 and 52.

As illustrated in FIGURES 4–15, each carton blank 45 is folded to erected form 46 illustrated in FIGURE 16 in the following steps.

Figure 5:
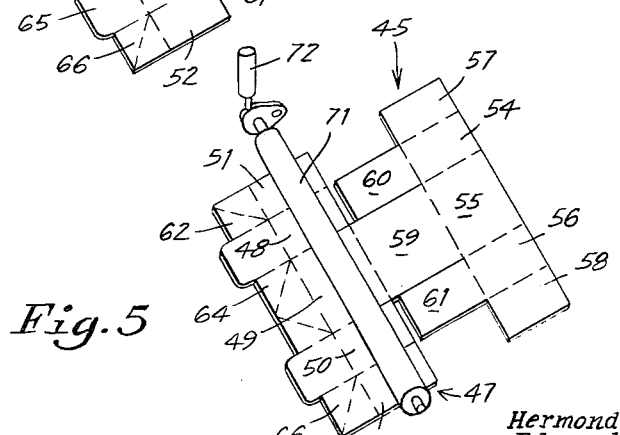

As illustrated in FIGURE 4, blank 45 is fed to machine 40 by feeding unit 41 wherein the leading edge of series 53 of panels 57—58 is fed between rotatable shafts 67 and 68 carrying a plurality of knurled rolls 69 forming nips when shaft 68 is pivoted downwardly toward shaft 67 by a pneumatic bellows or piston and cylinder arrangement 70 in a manner hereinafter described. As blank 45 is advanced to the right by shafts 67 and 68, an adhesive applying roller 71, FIGURE 5, is lowered at the proper time by pneumatic means 72 to apply adhesive to the series 47 of outer side panels 48–52 in the manner illustrated in FIGURE 5.

Subsequently, carton blank 45 is advanced below a substantially rectangular mandrel 73, FIGURE 6, carried by machine 40, panel 55 of blank 45 being disposed against one of the flat sides 74 of mandrel 73. When blank 45 is so advanced relative to mandrel 73, further movement of blank 45 to the right is terminated as same has passed beyond shafts 67 and 68.

Thereafter, folding means 75 and 76, FIGURE 7, fold panels 56 and 54 respectively against flat sides 77 and 78 of mandrel 73 and terminal part panels 57 and 58 about flat side 79 of mandrel 73 in the manner illustrated in FIGURE 7.

As illustrated in FIGURE 8, clamp means 80 then clamps terminal part panels 57 and 58 flat against side 79 of mandrel 73 whereby panels 54–58 form four sides of the inner liner of carton 46.

Opposed folding means 82 and 81, FIGURE 9, are operated in sequence to respectively fold inner bottom panels 61 and 60 into stacked relation against flat end 83 of mandrel 73 in the manner illustrated in FIGURE 9.

Mandrel 73 is then moved through an arc by machine 40 in a manner hereinafter described whereby blank 45 under the continued clamping action of clamping means 80 is carried through a curved trough defining means 84, FIGURES 10 and 11, to fold outer bottom panel 59 against the stacked inner bottom panels 60 and 61, full panel 49 against terminal part panels 57 and 58, and full panels 48 and 50 about full panels 54 and 56 in the manner illustrated in FIGURE 12.

Simultaneously, clamping means 80 is released while folding means 85, FIGURE 13, maintains full panel 49 of series 47 of outer side wall means flat against terminal part panels 57 and 58 of series 53 of inner side wall means to partially clamp and true-up carton 46.

Opposed holding means 86 and 87, FIGURE 14, then complete the folding of side panels 48 and 50, fold part panels 51 and 52 of outer side wall means flat against full panel 55 of inner side wall means to complete the forming of carton 46.

Folding means 85, 86 and 87 at the conclusion of the folding action, squeeze series 47 of outer side wall panels simultaneously against series 53 of inner side wall panels, thereby adhering the two series together and structurally strengthening the side walls.

As illustrated in FIGURE 15, mandrel 73 has ejectors 88 which force completed carton 46 axially therefrom into adhesive setting unit 44 which includes two spaced continuous top and bottom belts 89 and 90 adapted to maintain carton 46 in its erected position while the same travels therebetween a sufficient length of time to permit the adhesive to set and maintain carton 46 in its erected position. If desired, compression may also be applied to the remaining glued surfaces of the carton by similar means.

Therefore, it can be seen that machine 40 forms a completed carton 46 from a flat carton blank 45 in a simple and effective manner.

The details of machine 40 will now be described.

*Feeding Unit*

Feeding unit 41, as illustrated in FIGURES 20A and 21 includes a hydraulic or pneumatic lift table 91 adapted to carry a stack of carton blanks 45 and advance them upwardly as blanks 45 are serially taken from the top of the stack and fed to machine 40, hydraulic or pneumatic lift table 91 being operated by suitable hydraulic or pneumatic means in a manner well known in the art.

A pair of frame means 92 and 93 is suitably carried by support means 94 of machine 40 and has extensions 95 and 96 extending respectively therefrom away from machine 40. Each extension 95 and 96 carries a pair of spaced parallel guide arms 97 and 98 defining a channel 99 therebetween. A slidable arm 100 carries rollers 100a which are mounted in each of the guide channels 99 and is secured to a bracket 101 pivotally attached to one end of a link 102 having the other end thereof pivotally secured to a link 103 carried by a rotatable shaft 104, shaft 104 being rotatably carried by frame means 92 and 93 in the manner illustrated in FIGURE 1.

Guide arms 98 each have affixed thereto vertically extending cam member 105 provided with an arcuate cam surface 106.

The guide bar or link 100 has a pair of links 107 and 108 respectively pivotally secured thereto at one end thereof and pivotally secured at the other ends thereof to a bar 109, the opposed bars 109 carrying a transverse support bar 110 therebetween.

The transverse bar 110 carries a plurality of downwardly extending suction cup-like members 111 suitably interconnected to a vacuum pump 112, FIGURE 33, whereby a vacuum source may be connected to the cuplike members 111 when desired to hold top blank 45 of the stack thereof to transverse bar 110 in a manner hereinafter described.

Shaft 104, FIGURE 21, carries a gear 113 having teeth 114 and smooth concave lands 115 disposed in a predetermined pattern about the outer periphery thereof, gear 113 being adapted to mesh with a larger gear 116 having teeth 117 and smooth convex lands 118 suitably spaced about the outer periphery thereof in a predetermined pattern. Gear 116 is carried by a rotatable shaft 119 rotatably carried by frame means 92 and 93. Shaft 119 also carries a gear 120 disposed in meshing relation with a gear 121 carried by rotatable shaft 122, shaft 122 carrying a sprocket 123, FIGURE 20A.

A drive motor 124, FIGURE 20A, is interconnected to a synchronized motor 125 carrying a sprocket 126 which is interconnected to a sprocket 127 by a drive chain 128, the sprocket 127 being carried by a shaft 129. Another sprocket, not shown, is carried by shaft 129 and is interconnected to sprocket 123 by a drive chain 130.

The operation of feeding unit 41 will now be described.

Assuming that machine 40 is in the position illustrated in FIGURE 21, and it is desired to advance a blank 45 to the machine 40, the synchronizer motor 125 is operated to rotate gear 113 through the previous gear train and drive chain connections previously described. Simultaneously, vacuum source 112 is interconnected to the cuplike members 111 whereby top blank 45 of the stack is held by the cuplike members 111. As the gear 113 rotates, the link 102 is advanced to the right as illustrated in the drawings and carries the bracket 101 therewith. Thus, guide bars 100 are moved to the left on rollers 100a thereof in guide channels 99. As the guide bars 100 are moved to the right in guide channels 99, the bars 109 are raised vertically upwardly by springs 131 interconnected thereto at one end thereof and to the guide bar 100 at the other end thereof, bars 109 carrying roller cams 132 which ride against the vertically depending cams 105 of the guide arms 98. When the cams 132 have reached a point on guide arms 98 at the arcuate surface 106 thereof, the top blank 45 has been raised from the stack and further movement of the guide bar 100 to the right causes the bar 109 to also be moved to the right. Blank 45 carried by suction cups 111 is thus fed between the shafts 67 and 68, the shaft 68 being lowered by the pneumatic means 70 in a manner hereinafter described.

Thus, blank 45 is gripped by rolls 69, FIGURE 4, and advanced to the right through machine 40 in a manner hereinafter described.

Further rotation of the gear 113 returns suction cups 111 to the position illustrated in FIGURE 21 whereby another blank can then be fed to the machine 40 in the above manner.

*Adhesive Applying Unit*

The adhesive applying unit 42, FIGURE 21, includes a suitable reservoir 133 secured between frame means 92 and 93 and contains a supply of suitable adhesive. A pickup roll 134 is disposed in the reservoir 133 and is disposed in engagement with an adhesive pick-off roll 135, the rolls 134 and 135 being rotated by glue motor 136, FIGURE 33, through suitable interconnecting drive mechanism, not shown, in a manner well known in the art.

The adhesive applicator roll 71, FIGURE 5, is movable between two positions by pneumatic means 72 previously described, the adhesive applying roll 71 when in the up position receiving adhesive from adhesive pickoff roll 135 and when in the down position applying the same to the series 47 of outer side panel means in the manner previously described. If desired, the adhesive applying roll 71 may be rotated in a reverse direction than that from which the same would rotate if it were rotated solely by movement of the blank 45. Also, adhesive roll 71 may be free wheeling, if desired. A suitable back-up roll 137 is carried by the frame means 92 and 93.

The operation of the adhesive applying unit will now be described.

After the blank 45 is fed between the shafts 67 and 68 in the manner previously described by the feeding unit 41, the adhesive applying roll 71 is disposed in engagement with adhesive pick-off roll 135 whereby the same is covered with adhesive from the reservoir 133. At the proper time, pneumatic means 72 lowers the adhesive applying roll 71 against the blank 45 as the same passes over the backing roll 137 to apply adhesive to just the area defined by the series 47 of the outer side wall means. As the blank passes further between backing roll 137 and the adhesive applying roll 71, the pneumatic means 72 raises the adhesive applying roll 71 to its up postion to receive a new supply of adhesive for applying the same to a subsequent blank 45 passed through the machine 40.

*Folding Unit*

The folding unit 43 of the machine 40 includes a pair of opposed substantially rectangular mandrel members 73 and 73a, FIGURES 20A, 20B and 22, carried on a longitudinal support member 138 centrally pivoted to machine 40 by shaft 139, the shaft 139 being rotatably carried by brackets 140 secured to frame means 141 carried by the support means 94 of the machine 40.

The shaft 139 carries a gear 142 which meshes with a larger gear 143 carried by a shaft 144, FIGURE 27, suitably journalled in an indexing gear unit 145.

The indexing gear unit 145, FIGURES 27 and 28, includes a rotatable member 146 carried on a shaft 147 interconnected to the drive motor 124 by a suitable coupling 148. The rotatable member 146 has a helically disposed cam surface or thread 149 which meshes with rollers 150 circumferentially disposed about and carried by the shaft 144. The thread or cam surface 149 of the rotatable cam member 146 is so constructed and arranged that the same drives the gear 143 of the shaft 144 through varying speeds such as in a Geneva movement.

When the drive motor 124 is operating, the same rotates gear 143 through indexing unit 145 whereby the support means 138 carrying mandrels 73 and 73a is rotated through an arc of 180° to reverse the position of mandrels 73 and 73a for a purpose hereinafter described. Further movement of the gear 143 again reverses the position of the mandrels 73 and 73a to their original positions.

In order to align the mandrels 73 and 73a in the position illustrated in FIGURES 20A and 20B, whether or not mandrels 73 and 73a are reversed, a pneumatic member or a piston and cylinder arrangement 151, FIGURE 23, carried by frame means of the machine 40 is adapted to advance a plunger 152 thereof, FIGURE 24, into an opening 153 formed in the support means 138 carrying mandrels 73 and 73a, openings 153 and 153a being formed in the support means 138 on each side of the rotatable shaft 139. Thus, after mandrels 73 and 73a have been advanced through arcs of 180°, the pneumatic means 151 will align the same in the proper position by advancing the plunger 152 into the respective opening 153 or 153a and thereafter retract the plunger 152 therefrom.

As illustrated in FIGURES 20A, 24 and 25, the opposed folding means 75 and 76 each comprises a pneumatic device 154a or 154b carrying a shaft 155 which is rotated in one direction, but which may be rotated in the other direction, when the pneumatic means 154a or 154b is operated in such other direction. A shaft 155 is rotatably secured to a horizontal brace 156, FIGURE 25, which is, in turn, secured to vertical supports 141 of the machine 40, the shaft 155 being rotatably carried by brackets 157 secured to horizontal braces 156 in the manner illustrated in FIGURE 25. A folding arm 158 is carried on the end of each shaft 155, the arms 158 being so constructed and arranged that the same are disposed against the respective flat sides 77 and 78 of either mandrel 73 or 73a, when mandrel 73 or 73a is in the position illustrated in FIGURES 24 and 25.

Each folding arm 158 carries an outwardly extending roller means 159 which is adapted to be moved over the side 79 of mandrel 73 or 73a when the arms 158 are in their raised position.

Folding means 81 and 82 are respectively carried by the arms 158 of folding means 76 and 75 in the manner illustrated in FIGURES 20A, 24 and 25. Each folding means 81 and 82 comprises a pneumatic means 160 or 160a secured to arm 158 by bracket 161. Piston 162 of the pneumatic means 160 or 160a carries a plate or arm 163 which is adapted to be advanced parallel to the flat end 83 of mandrel 73 or 73a when the arms 158 are in their raised position.

The operation of folding units 75, 76, 81 and 82 will now be described.

As previously stated, after carton blank 45 has been advanced to the position illustrated in FIGURE 6, pneumatic means 154a and 154b, see FIGURE 24, are actuated to rotate shafts 155, and thus, pivot arms 158 upwardly against sides 77 and 78 of the respective mandrel 73 or 73a disposed in the position illustrated in the drawings, the arms 158 carrying therewith the full panels 56 and 54 and disposing the same flat against the sides 77 and 78 of mandrel 73 or 73a. Roller means 159 carried by the arms 158 engages terminal part panels 57 and 58 of blank 45 and causes the same to be folded toward each other in the manner illustrated in FIGURE 7. Subsequently, pneumatic means 160 of folding means 82 is operated to its extended position to fold inner bottom panel 61 flat against flat end 83 of mandrel 73 or 73a. Thereafter, pneumatic means 160a of folding means 81 is operated, when in the raised position, to fold inner bottom panel 60 flat against folded inner bottom panel 61 in the manner illustrated in FIGURE 9.

After folding means 75, 76, 81 and 82 have been operated in the above manner, the same are retracted and returned to the position illustrated in FIGURES 20A and 24.

To assist in initial positioning of the carton blank in the machine with panel 55 positioned under the mandrel 73, and to hold said panel firmly pressed against the mandrel during the folding operations previously described, there is rotatably mounted on each of the shafts 155 a forwardly and horizontally extending bar 155a. Each bar 155a is tapered at 155b to facilitate insertion of the blank between the bar 155a and the lower face of the mandrel 73.

Each bar 155a is connected by a radial extension 155c to a supporting sleeve 155d rotatably mounted on shaft 155 (FIGURE 25). A coil spring 155e positioned around each shaft 155 has its ends engaging sleeve 155d and adjacent stationary structure (as shown) to yieldably urge said bars 155a upwardly against the panel 55 to clamp it against the mandrel 73. The springs 155e permit the bars 155a to be automatically swung in the direction indicated by the arrows of FIGURE 24 to permit the mandrel to push them out of the way so as to be able to move downwardly therebetween, as will hereinafter be more fully described.

Each mandrel 73 or 73a carries a folding means 80 or 80a, FIGURE 22, which comprises a pneumatic means 164a or 164b pivotally secured to support means 138 by a bracket 165. A piston 166 of pneumatic means 164a or 164b carries a head 167 having a finger 167a extending therefrom, the head being secured to the respective mandrel 73 or 73a by a link 168, see FIGURE 22, the link 168 being pivotally secured at one end thereof to its respective mandrel 73 or 73a and being pivotally secured to the head 167 at the other end thereof.

As illustrated in the right hand side of FIGURE 22, the folding means 80a thereof is disposed in its retracted position. However, when pneumatic means 164a or 164b is operated in one direction thereof, the same causes piston 166 to be advanced outwardly whereby link 168 causes the head 167 to be moved through an arcuate path before same is in the position illustrated in the left hand mandrel 73 of the drawing in FIGURE 22 and is disposed substantially flat against the side 79 of mandrel 73.

The operation of folding means 80 and 80a will now be described.

As illustrated in FIGURE 8, after terminal part panels 57 and 58 of blank 45 have been bent to the position illustrated in FIGURE 7 by the roller means 159 of folding means 75 and 76, the respective folding means 80 is actuated whereby shaft 166 is extended to cause the head 167 to move through an arcuate path and thus fold the terminal part panels 57 and 58 flat against the side 79 of the respective mandrel 73.

Holding means 80 remains in this extended position throughout the movement of mandrel 73 through its arc of 180° until the same is retracted just before the folding means 85 (FIGURES 13 and 29) are in operation in the manner hereinafter described.

The ejector means 88, see FIGURES 15 and 22, of each of the mandrels 73 and 73a includes a plurality of plungers 169 disposed inside the respective mandrel 73 or 73a and reciprocally mounted in apertures 170 formed in the flat end 83 of its respective mandrel 73 or 73a. The plungers 169 are carried by a plate 171 which is attached to a piston 172 of a pneumatic cylinder and piston arrangement 173a or 173b, the arrangement 173a or 173b being interconnected to support means 138 as shown at 174.

When it is desired to eject a completed carton 46 from a mandrel 73 or 73a, when the mandrel 73 or 73a is disposed in the right hand position illustrated in FIGURE 20B, the pneumatic hydraulic cylinder and piston arrangement 173a or 173b of that particular mandrel 73 or 73a is actuated whereby the piston 172 thereof causes the plate 171 and, thus, the plungers to move to the right to force carton 46 into the adhesive setting unit 44, FIGURE 1.

Figure 10:
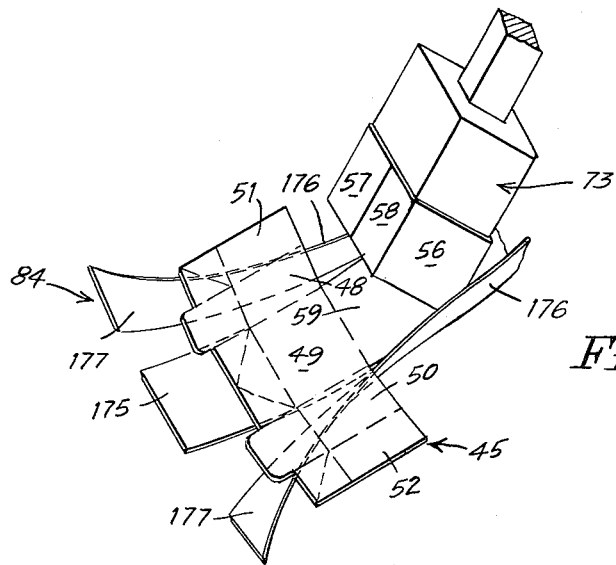
Figure 11:
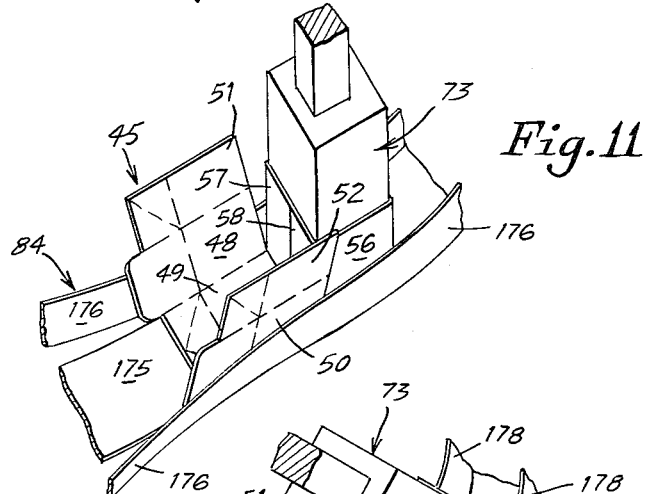

Trough defining means 84, FIGURE 10, includes a suitably curved bottom member 175 leading from gluing unit 42 and passing first downwardly and thence upwardly toward the adhesive setting unit 44.

A pair of side members 176, FIGURES 10 and 20A, is carried by machine 40 and have outwardly flared ends 177 adjacent the gluing unit 42 and substantially parallel ends 178 adjacent the adhesive setting unit 44. As illustrated in FIGURES 10 and 11, as mandrel 73 or 73a begins its movement through the trough defining unit 84, the outwardly flared ends 177 of members 176 begin the initial folding of outer side wall means 47 of blank 45 and continue to fold panels 48 and 50 thereof at right angles relative to panel 49 thereof when mandrel 73 or 73a reaches the position illustrated in FIGURE 20B. Similarly, curved bottom member 175 of the trough defining means 84 causes the outside bottom panel 59 to be disposed against the stacked inner bottom panels 60 and 61 and panel 49 to be disposed against part panels 57 and 58, FIGURE 10.

Folding means 85, illustrated in FIGURE 13, is shown in greater detail in FIGURES 29 and 30 and comprises a rotary cylinder and piston arrangement 179 carrying a shaft 180 disposed adjacent flat end 83 of mandrel 73 or 73a, when mandrel 73 or 73a is disposed in the position illustrated in FIGURES 29 and 30. When the arrangement 179 is operated in a particular direction, the shaft 180 is rotated in a particular direction and rotates an arm 181 carrying a plurality of rollers 182 upwardly against mandrel 73 or 73a to hold panel 49 against part panels 57 and 58 in the manner illustrated in dotted lines in FIGURE 29.

When the carton 46 is ejected from mandrel 73 or 73a, the arm 181 is in the upper position whereby carton 46 is adapted to roll on rollers 182 and be ejected toward the adhesive setting unit 44.

Folding means 86 and 87, FIGURE 14, are shown in greater detail in FIGURES 31 and 32 and each includes a housing 183 slidably carrying a plurality of rods 184 having rollers 185 on the outer ends thereof, the rods 184 being carried by plate member 186 interconnected to a piston 187 of pneumatic cylinder and piston arrangement 188a or 188b of housing 183.

When arrangement 188a or 188b is actuated, it forces rollers 185 toward mandrel 73 or 73a when disposed in the position illustrated in FIGURE 20B, whereby rollers 185 thereof fold part panels 51 and 52 flat against panel 55 in the manner illustrated in FIGURE 14.

When the completed carton 46 is ejected from the mandrel 73 or 73a, rollers 185 are disposed in the inward position whereby carton 46 is adapted to be moved relative thereto adhesive setting unit 44.

*Adhesive Setting Unit*

The adhesive setting unit is best illustrated in FIGURE 20B and comprises frame means 189 carried on a vertical post 190 secured to support means 94 of machine 40.

As previously stated, the adhesive setting unit 44 includes a pair of continuous conveyor belts 89 and 90 respectively passing over rollers 191, 192 and 193, 194.

Rollers 191 and 193 are rotated by a drive chain 195 driven by a sprocket 196, the sprocket 196 being driven by a drive chain 197 in turn driven by a sprocket 198. The sprocket 198 is driven by a suitable motor 199. In this manner, belts 89 and 90 are driven in the proper direction to move ejected carton 46 from the left to the right as viewed in FIGURE 20B.

A plurality of rollers 200 is carried by links 201 secured to frame means 189, the rollers 200 tending to urge conveyor belts 89 and 90 into engagement with carton 46 as the same passes therebetween to firmly hold the various panels in proper position while the adhesive sets.

Frame means 189 also carries a plurality of side rollers 202 to hold the respective side of carton 46 in the proper position as the same passes therethrough.

Figure 3:
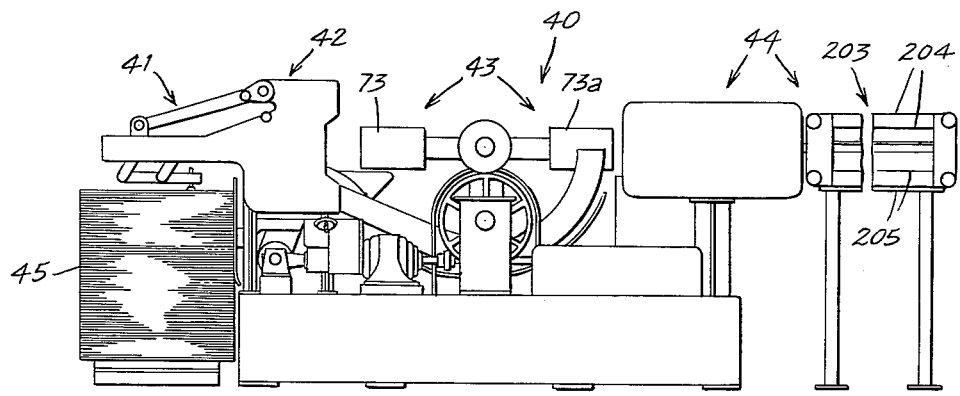
FIGURE 3 is a side elevation view of the apparatus illustrated in FIGURE 1.

If desired, setting unit 44 may be supplemented with an additional adhesive setting unit 203, FIGURES 2 and 3, the unit 203 being constructed similarly to unit 44 and comprising two continuous conveyors 204 and 205 between which the completed carton 46 passes before the same is utilized to receive the contents thereof.

Figure 17:
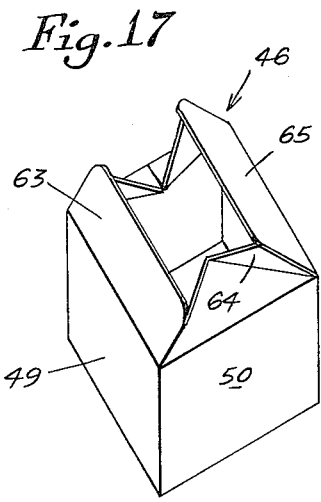
FIGURES 17–19 are respectively, perspective views illustrating the manner of closing the erected carton illustrated in FIGURE 16.
Figure 18:
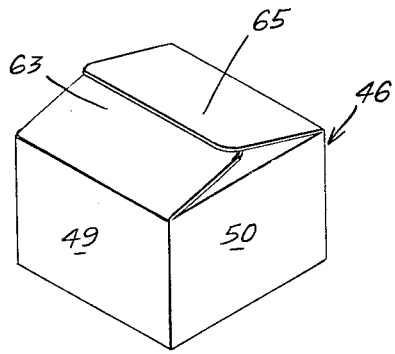
Figure 19:
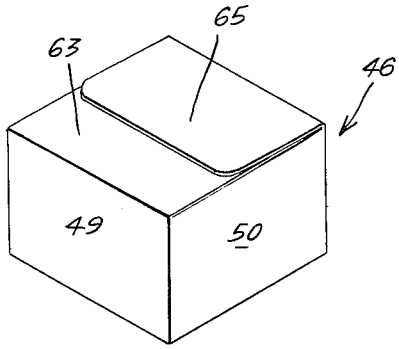

As illustrated in FIGURES 17–19, completed carton 46, after being filled, is subsequently closed in the manner illustrated, the particular details of carton 46 and its closing means being the subject matter of the aforementioned co-pending patent application.

Pneumatic System

As illustrated in the schematic diagram of FIGURE 35, a suitable source, not shown, of air pressure or the like is interconnected to a manifold 206 of machine 40 by an inlet conduit 207, inlet conduit 207 having suitable air filters 208 and a pressure regulator valve 209.

Manifold 206 is interconnected to the pneumatically operated cylinder and piston arrangements 70 and 72 by a suitable conduit 210 which branches into two branch pipes 211 and 212 leading respectively to pneumatic means 70 and 72.

Each of the pneumatic arrangements 154a and 154b and their respective associated hydraulic arrangements 160 and 160a are interconnected to the manifold 206 by conduits 213 and 214. Conduit 213 leads to a valve 215 interconnected to opposite ends of the rotary cylinder and piston arrangement 154a by branch conduits 216 and 217.

Similarly, the conduit 214 leads to a valve 218 interconnected to opposed ends of the rotary arrangement 154b by conduits 219 and 220.

The index cylinder and piston arrangement 151 is interconnected to the manifold 206 by a conduit 221.

Pneumatic piston and cylinder arrangements 164a, 164b, 173a and 173b carried by mandrels 73 and 73a, support 138 thereof are all interconnected to the manifold 206 by a conduit 222 leading to a rotary valve 223 interconnected in turn to the hollow shaft 139 carrying mandrel support means 138, the hollow shaft 139 being connected to respective cylinder and piston arrangements 164a, 164b, 173a and 173b by branch conduits 224, 225, 226 and 227.

The pneumatic arrangements 188a and 188b are interconnected to the manifold 206 by a conduit 228 branching off into conduits 229 and 230 leading respectively to the pneumatic piston and cylinder arrangements 188a and 188b.

Rotary piston and cylinder arrangement 179 is interconnected to the manifold 206 by a conduit 231 leading to valve 232 which is, in turn, interconnected to opposite ends of the rotary arrangement 179 by branch conduits 233 and 234.

While the forms of piston and cylinder arrangements may vary as desired, in the embodiment illustrated in the drawings, the various pneumatic means are adapted to be operated in one direction by air pressure from the source and in the other direction by air pressure from the source whereby it is necessary to provide actuating means for operating the pneumatic means in either of their operating positions.

Electrical System

As illustrated in FIGURE 33, electrical current is supplied to the machine 40 by a suitable source, not shown, through leads 235, 236 and 237, leads 235 and 236 being interconnected to one side of a transformer 238.

Transformer 238 is a step-down transformer and has low voltage leads 239 and 240 leading therefrom.

Leads 235 and 236 also lead to another step-down transformer 241, the transformer 241 having step-down voltage leads 242 and 243 leading therefrom.

Take-off leads 244 and 245 lead respectively from leads 242 and 243 for a purpose hereinafter described.

Leads 242 and 243 are respectively interconnected to control panel 246 and drive motor 124. Similarly, high voltage leads 235, 236 and 237 are interconnected to the drive motor 124, feed motor 126, glue motor 136, vacuum pump 112 and adhesive setting unit motor 199 as illustrated in FIGURE 33.

Control panel 246 includes a master stop switch 247, a drive motor start switch 248, a glue motor start switch 249, a vacuum pump motor start switch 250, an adhesive setting unit motor start switch 251, a drive motor stop switch 252, a glue motor stop switch 253 and a drive motor jog switch 254.

The various switches 247–254 are appropriately interconnected with motors 124, 126, 136, 112 and 199 in the manner illustrated to perform the specified functions thereof.

A pair of switches 255 and 256 is carried by the machine 40 and is so located relative to mandrel 73 or 73a disposed adjacent feed unit 41 that the same is normally open and prevents operation of drive motor 124 until the blank 45 has been properly positioned relative to mandrel 73 or 73a.

A jam prevention switch 257 is provided and is provided for stopping the drive motor 124 should a blank become jammed in the feed unit 41.

As illustrated in FIGURE 34, leads 239 and 240 from the transformer 238 lead to a bank of cam operated switches generally indicated by the numeral 258 in FIGURES 20B and 34. As illustrated in FIGURE 20B, a shaft 259 is interconnected to the shaft 147 of indexing gear box 145 through a suitable reducing gear train 260. Shaft 259 carries a plurality of spaced discs or switch actuating means 261–273, each switch 261–273 having a pair of adjustable cam actuators 274 and 275 thereon. As the discs 261–273 rotate with shaft 259, the cams 274 and 275 thereof operate switches in a desired sequence in a manner hereinafter described.

As illustrated in FIGURE 34, the leads 244 and 245 from the transformer 241, FIGURE 33, are so connected that lead 244 is respectively connected to one side of two solenoids 276 and 277 by branch leads 278 and 279. The other side of solenoids 276 and 277 are respectively connected to the lead 245 by leads 280 and 281, the leads 280 and 281 respectively having normally open switches 282 and 283 therein positioned relative to the switch actuating means 261 in the manner illustrated in FIGURE 34.

Solenoids 276 and 277 respectively actuate a valve 284 interconnecting the vacuum pump 112 with the suction cup like cups 111 of the feeding unit 41.

Thus, when the switch actuating means 261 closes the switch 283, the solenoid 277 is actuated to interconnect vacuum source 112 to suction cups 111 to grip a blank 45 therewith. When switch 282 is actuated by the switch actuating means 261, the solenoid 276 is actuated and disconnects vacuum source 112 from suction cups 111 whereby the blank 45 can be fed into the machine 40.

Switch actuating means 262 is adapted to actuate two switches 285 and 286, the switch 285 normally being closed and switch 286 normally being open. Switch 286 interconnects a lead 287 to the lead 289 and, thus, one side of the pneumatic cylinder and piston arrangement 72 to the lead 239. The other side of the arrangement 72 is interconnetced to the lead 239 by a lead 288. Thus, when switch 286 is closed, the glue applicator roll 71 is raised to its up position. Glue applicator roll 71 is lowered when a switch 289 in lead 288 is closed whereby glue applicator roll 71 applies glue to blank 45 being fed through the machine 40, the switch 289 being tripped by a particular surface of blank 45 passing through the machine 40 in a manner well known in the art.

The pneumatic cylinder and piston arrangement 70 has one side thereof interconnected to lead 239 by a lead 290 and the other side interconnected to the lead 239 by a lead 291, leads 290 and 291 respectively having normally open switches 292 and 293 therein.

Thus, when switch actuating means 263 is rotated and one of the cams 274–275 thereof closes the switch 292, the arrangement 70, FIGURE 4, moves the shaft 68 downwardly to form a means for feeding the blank 45 into the machine 40. When switch 293 is closed by switch actuating means 263, the arrangement 70 raises shaft 68, thereby preventing another blank 45 from entering the machine 40 until the proper time.

The pneumatic cylinder and piston arrangement 160a has opposed sides thereof interconnected to the lead 239 by leads 294 and 295, the leads 294, 295 respectively having normally open switches 296 and 297 therein and located adjacent the switch actuating means 264.

Similarly, the pneumatic cylinder and piston arrangement 160 is interconnected to the lead 239 by leads 298 and 299, the leads 298 and 299 respectively having normally open switches 300 and 301 therein disposed adjacent the switch actuating means 265.

Rotary pneumatic piston and cylinder arrangements 154a and 154b are respectively interconnected to the lead 239 by leads 302 and 303 which respectively have normally open switches 304 and 305 therein disposed adjacent switch actuating means 266.

Switch actuating means 267 is adapted to interconnect the lead 239 to either side of the pneumatic piston and cylinder arrangement 151 by closing either normally open switch 306 or 307 disposed respectively in leads 308 and 309 leading to opposite sides of the arrangement 151.

Cylinder and piston arrangement 173a is interconnected to lead 240 by leads 310 and 311 being respectively interconnected to collector rings 312 and 313 carried by shaft 139 rotatably supporting the mandrels 73 and 73a. Collector rings 312 and 313 are respectively connected to the lead 240 by leads 314 and 315 which respectively have normally open switches 316 and 317 therein disposed adjacent switch actuating means 268.

Collector rings 318 and 319 respectively interconnect leads 320 and 321 leading to opposite sides of the pneumatic cylinder and piston arrangement 164a to leads 322 and 323 leading respectively to lead 240, the leads 322 and 323 respectively having normally open switches 324 and 325 disposed adjacent the switch actuating means 269.

Similarly, the pneumatic piston and cylinder arrangements 164b and 173b have pairs of leads 326, 327 and 328, 329 connected respectively to collector rings 330, 331 and 332, 333. Collector rings 330 and 331 are respectively interconnected to lead 240 by leads 334 and 335 having normally open switches 336 and 337 therein, the switches 336 and 337 being disposed adjacent switch actuating means 270. Similarly, collector rings 332 and 333 are respectively interconnected to lead 240 by leads 338 and 339, the leads 338 and 339 respectively having normally open switches 340 and 341 therein and being disposed adjacent switch actuating means 271.

Pneumatic cylinder and piston arrangements 188a and 118b are respectively interconnected to lead 240 by leads 342 and 343 respectively having normally open switches 344 and 345 therein disposed adjacent switch actuating means 272.

Rotary pneumatic cylinder and piston arrangement 232 is interconnected to lead 240 by leads 346 and 347 respectively having normally open switches 348 and 349 therein disposed adjacent switch actuating means 273.

It is to be understood that the various switch actuating means 263–273 actuate the respective switches in a desired sequence to operate machine 40 in a manner hereinafter described although cam surfaces 273 and 275 of disc-like members 261–273 are all illustrated schematically in the same position.

*Operation of the Machine*

When mandrels 73 and 73a are disposed in the position illustrated in FIGURES 20A and 20B and it is desired to form cartons 46 from blanks 45 stacked on hydraulic lift table 91, the operator merely starts machine 40 by pressing the switches 248, 249, 250 and 251.

Since the thread 149, FIGURES 27 and 28, is disposed substantially centrally along part of rotatable member 146 when the mandrel 73 and 73a are in the position illustrated, gear 143 is not rotated even though motor 124 is driving the shaft 147. As shaft 147 is rotating, even though gear 143 is not rotating at this time, the cam shaft 259 is rotated whereby certain of the switch actuating means 261–263 are operated as follows, see also FIGURE 20B.

Switch actuating means 261 closes switch 283 and thus actuates solenoid coil 277 to operate valve 284 to interconnect vacuum pump with the suction cup members 111 to hold blank 45 thereto.

Gears 116 and 113, FIGURE 21, are so constructed and arranged that the teeth 117 and 114 thereof begin to mesh and move blank 45 toward machine 40 in the manner previously described.

Soon thereafter, switch actuating means 263 closes switch 292 to operate pneumatic piston and cylinder arrangement 70 to move shaft 68 downwardly toward shaft 67 whereby rollers 69 carried thereby form a means for receiving the blank 45 moving to the right and feed the same into machine 40.

As blank 45 is fed into machine 40 by shafts 67 and 68, the electric eye switch actuating means 262 closes switch 286 whereby glue applicator roller 71 descends against moving blank 45 and applies adhesive to the series 47 of outer side wall means and then raises same as the rest of blank 45 passes under applicator roll 71.

Shafts 67 and 68 continue to feed blank 45 into the machine 40 until the panel 55 thereof is disposed beneath mandrel 73 in the manner illustrated in FIGURE 6.

Thereafter, the switch actuating means 266 closes switch 304 and causes the pneumatic rotary piston and cylinder arrangements 154a and 154b to swing the arms 158 upwardly to fold side panels 54 and 56 against the sides 77 and 78 of the mandrel 73 in the manner illustrated in FIGURE 7.

Subsequently, the switch actuating means 269 closes switch 324 to operate the pneumatic piston and cylinder arrangement 164a to hold part panels 57 and 58 flat against the flat top surface 79 of the mandrel 73 in the manner illustrated in FIGURE 8.

Switch actuating means 265 then closes switch 300 to operate the pneumatic piston and cylinder arrangement 160 to fold the inner bottom panel 61 against the flat end 83 of mandrel 73. Thereafter, the switch actuating means 264 closes the switch 296 to operate the pneumatic piston and cylinder arrangement 160a to fold the inner bottom panel 60 against the folded bottom panel 61 in the manner illustrated in FIGURE 9.

Subsequently, switch actuating means 266 closes the switch 305 whereby the rotary piston and cylinder arrangements 154a and 154b lower the arms 158 and switch actuating means 264, 265 respectively close the switches 297 and 301 to retract the arms 163 interconnected to the pneumatic cylinder and piston arrangements 160a and 160, FIGURE 24.

After the pneumatic piston and cylinder arrangements 154a, 154b, 160 and 160a have been returned to their original positions, the thread 149 of rotatable member 146 begins to rotate the gear 143, FIGURES 20B and 27, whereby mandrel 73 is moved through an arc of 180° through the trough defining means 84. As mandrel 73 carrying the blank 45 therewith moves through the trough defining means 84, the outwardly flared ends 177 of the side members 176, FIGURE 20A, begin to fold panels 51, 48 and 50, 52 inwardly as bottom panel 59 is brought about the stacked inner bottom panels 60 and 61.

Figure 12:
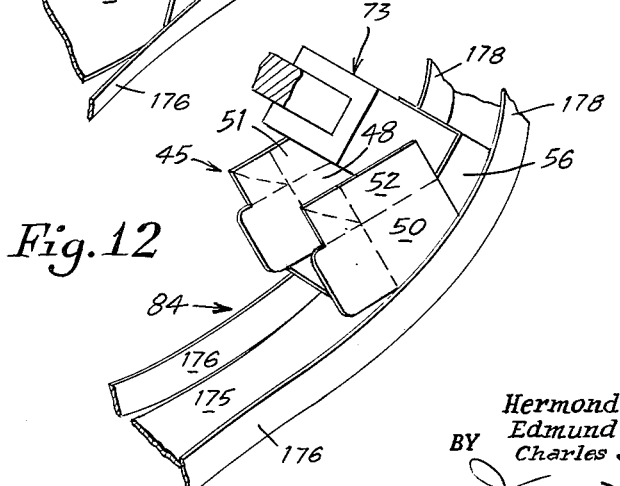

Further movement of mandrel 73 through the trough defining means 84 causes the full panel 49 to be brought adjacent the part panels 57 and 58 and full panels 48 and 50 to be brought about the full panels 54 and 56 in the manner illustrated in FIGURE 12.

When mandrel 73 has reached the position illustrated in FIGURE 12, the thread 149 of rotatable member 146 is in such a position that further movement of the rotatable member 146 prevents further rotation of the gear 143.

Cam shaft 259 has been rotated to such a position that switch actuating means 267 closes the switch 306 to cause the pneumatic piston and cylinder arrangement 151 to urge the plunger 152 into the aperture 153a of mandrel support 138 to properly align mandrels 73 and 73a in the machine 40 as illustrated in FIGURES 24, 20A and 20B.

Thereafter, the switch actuating means 267 closes switch 307 which causes the pneumatic piston and cylinder arrangement 151 to retract plunger 152.

Switch actuating means 269 closes the switch 325 to cause the arrangement 164a to retract the arm 167 from holding the part panels 57 and 58 against mandrel 73, FIGURE 22.

Subsequently, switch actuating means 273 closes the switch 348 to actuate the rotary pneumatic piston and cylinder arrangement 179 to cause the arm 181, FIGURE 29, to hold full panel 49 against the part panels 57 and 58 in the manner illustrated in FIGURE 13.

In order to fold the final part panels 51 and 52 of blank 45 into position, the switch actuating means 272 closes switch 344 and this simultaneously causes the pneumatic piston and cylinder arrangements 188a and 188b to expand and move the rollers 185, FIGURE 31, over the mandrel 73 to fold part panels 51 and 52 flat against full panel 55, FIGURE 14.

Thereafter, the switch actuating means 268 closes the switch 316 to cause the arrangements 173a, FIGURE 22, to force plungers 169 outwardly to eject the completed carton 46 into the adhesive setting unit 44 whereby the moving belts 89 and 90 thereof convey the same therebetween to hold the flaps in their folded position until the adhesive has been set and carton 46 ejected from the end thereof. However, as previously stated, an additional conveyor means 203, FIGURES 2 and 3, may be provided to increase the adhesive setting time.

Thereafter, the switch actuating means 272 closes switch 345, the switch actuating means 273 closes the switch 349 and the switch actuating means 268 closes switch 317 to respectively cause the pneumatic piston and cylinder arrangements 188a, 179 and 173a to be retracted to their original positions.

While the carton 46 was being folded on mandrel 73, another carton blank 45 was being fed to the other mandrel 73a when mandrel 73a was in the position adjacent the feed unit 41. Thus, it can be seen that a continuous operation is provided whereby the cartons 45 are folded into erected cartons 46 automatically.

Therefore, it can be seen that there has been provided an improved method and apparatus for forming erected cartons from flat, cut and scored carton blanks with a minimum of time and effort.

To adjust the apparatus for producing cartons of different depths, the adhesive applying unit 42 is moved on its pair of support rods 42a (FIGURES 20A and 21) toward or away from the folding unit 43. The relative adjusted positions of units 42 and 43 are maintained by a conventional clamp operated by arm 42b. The blank feeding unit 41 is similarly moved. Units 41 and 42 are then adjusted to handle the different dimensioned blank by interchanging the crank arm 103 and gears and sprockets for varying the amount of travel of the longer or shorter blank through the unit 42, in manners that would be obvious to one skilled in this art.

The speed of operation of the apparatus can be varied as desired, either by altering the motor speed electrically or by interposing a mechanical speed-varying transmission between the motor and parts driven thereby, both methods being broadly old and well known. Such systems could also include a slip clutch with or without a safety circuit breaker to shut off the power in the event of jamming of the apparatus.

While the foregoing present preferred embodiments of the present invention, it is obvious that other modifications and/or equivalents may be employed without departing from the scope of the invention, which is defined in the appended claims.

What is claimed is:

1. Automatic apparatus for forming an erected multiply carton from a flat blank having a first group of edge-joined panels including a first row of edge-joined panels foldable to define circumferentially continuous inner side walls of said carton, a second group of edge-joined panels including a second row of edge-joined panels substantially parallel to and spaced from said first row of panels and foldable over and around said first row of panels to define circumferentially continuous outer side walls of said carton, a first bottom panel extending between and connected at opposite sides thereof to a side of one of the panels of each of said rows of panels, and a pair of additional bottom panels one adjacent each side of said first bottom panel and foldable to overlie the inner surface of said first bottom panel to reinforce the same, said apparatus comprising: at least one mandrel member of rectangular cross section corresponding in size and shape to the inner dimensions of said carton, means for swinging said mandrel member through an arc of 360°, means for arresting movement of said mandrel member at relatively widely spaced points in the swinging movement thereof, means for positioning a carton blank for coincident-margin engagement of a panel of said first row of panels by a side face of said mandrel member, means for wrapping the other panels of said first row of panels around the other faces of said mandrel member, means for temporarily holding said first row of panels in embracing contact with said mandrel member, means for folding said additional bottom panels over the free end of said mandrel member, trough-like means positioned beside and along the path of travel of said mandrel member as the latter moves between certain of said widely spaced points, said trough-like means being progressively constricted to fold and press said first bottom panel over and against said additional bottom panels and then fold and press medial panels of said second row of panels over and against said first row of panels, means for folding the end panels of said second row of panels against a medial panel of said first row of panels, and means for removing the thus formed carton from said mandrel member.

2. Apparatus according to claim 1, additionally comprising means for holding a stack of flat carton blanks and means for intermittently feeding a blank from said stack to said means for positioning said blank.

3. Apparatus according to claim 2, additionally comprising means constructed and arranged to apply adhesive material to at least selected areas of at least one of said rows of panels during the feeding movement of said blank.

4. Apparatus according to claim 3, additionally comprising means for holding said second row of panels in firm contact with said first row of panels for a predetermined period of time sufficient for at least partial setting of said adhesive material.

5. Apparatus according to claim 1, additionally comprising a series of sensing devices positioned to be operable by various portions of a carton blank as the same is being positioned for engagement by said mandrel member, and means operable by any one of said sensing devices to stop said apparatus in response to improper positioning of said blank therein, thereby preventing jamming of said apparatus.

6. Apparatus according to claim 1, said means for wrapping said other panels of said first row of panels around said other side faces of said mandrel member comprising a pair of arms swingable against opposite sides of said mandrel member, and inwardly directed extensions at the free ends of said arms for bending end panels of said first row of panels against the fourth side of said mandrel member.

7. Apparatus according to claim 6, additionally comprising a pair of rotary fluid motors connected to said mandrel member and having rotary shafts oscillatable thereby, said shafts constituting the driving pivots for said arms.

8. Apparatus according to claim 7, said means for folding said additional bottom panels being fluid-actuated laterally movable plungers fixed to and movable into actuating positions by said swingable arms.

9. Apparatus according to claim 1, said means for temporarily holding said first row of panels in embracing contact with said mandrel member comprising a finger adapted to extend over and bridge the gap between the ends of said first row of panels when wrapped around said mandrel member, and air-actuated means for moving said finger longitudinally of and simultaneously toward or away from clamping position relative to said ends of said first row of panels.

10. Apparatus according to claim 1, said means for folding the ends of said second row of panels comprising fluid-actuated sets of tapered-end parallel rollers axially movable laterally inwardly toward each other to force the end panels of said second row of panels to coplanar substantial edge engagement, said rollers permitting removal of said carton from said mandrel member by rotation of said rollers thereby while said carton is pressed against said mandrel member by said rollers.

11. Apparatus according to claim 1, said means for removing said formed carton from said mandrel member comprising fluid-actuated plunger means carried by said mandrel member and extrudable therefrom against the bottom of said formed carton.

12. Apparatus according to claim 1, additionally comprising at least one belt-like conveyor device engaging at least one side of a removed formed carton for moving the same from said erecting apparatus proper, and continuous pressure applying means engaging opposite sides of said carton while moved by said conveyor device for a time sufficient for substantial setting of said adhesive material.

13. Apparatus according to claim 1, and comprising at least one additional mandrel member, and a medially pivoted arm interconnecting said mandrel members and constituting means for moving said mandrel members through 180° between alternating blank-engaging and carton-discharging positions.

14. A method of forming a double-walled reinforced-bottom carton, comprising: cutting and scoring a flat blank of foldable carton material to define a first row of edge-joined panels, a second row of edge-joined panels spaced from and parallel to said first row of panels, a first bottom panel interconnecting a medial panel of said first row of panels, to a medial panel of said second row of panels, and a pair of additional bottom panels connected to the edges of panels of one of said rows of panels on opposite sides of said first bottom panel; folding said first row of panels to define circumferentially continuous inner side walls of said carton; folding said additional bottom panels to form the inner bottom portion; folding said first bottom panel to form the outer bottom portion; folding said second row of panels over and around said first row of panels to define circumferentially continuous outer side walls of said carton; and fastening said rows of panels to each other in overlapping interengagement.

References Cited in the file of this patent
UNITED STATES PATENTS

| | | |
|---|---|---|
| 1,993,605 | Jahne | Mar. 5, 1935 |
| 2,116,362 | Ness | May 3, 1938 |